INVENTOR
JOHN T. SWEENEY

March 24, 1970   J. T. SWEENEY   3,502,119
BAG FILLING APPARATUS

Filed Dec. 15, 1966   3 Sheets-Sheet 3

INVENTOR
JOHN T. SWEENEY

United States Patent Office 3,502,119
Patented Mar. 24, 1970

3,502,119
BAG FILLING APPARATUS
John T. Sweeney, Lincroft, N.J., assignor to Tenneco Chemicals, Inc., a corporation of Delaware
Filed Dec. 15, 1966, Ser. No. 602,092
Int. Cl. B65b 3/10, 1/04
U.S. Cl. 141—68  3 Claims

ABSTRACT OF THE DISCLOSURE

A bag packing organization wherein material is conveyed from a bulk source to a weighing chamber via a vibratory feeder. When a predetermined weight of material is collected in the chamber the feeder is stopped and the predetermined weight of material is discharged from the chamber to a bag filler having an angularly disposed filling spout with a screw conveyor therein. The bag to be filled is placed about the spout and is supported in a trough, a portion of which underlies the spout and is parallel thereto.

---

This invention relates to apparatus for discharging powdered, granular and the like material into a container and more particularly to improved apparatus for automatically filling a bag with a predetermined weight of the material.

Various types of apparatus are available for automatically weighing and bagging dry solids. The overall operating accuracy and reliability of the prior apparatus is such that frequent check-weighing of the filled bags, or manual adjustment of the final weight, is necessary. For example, in the case of 50 pound bags, only 75% of the filled bags fall within a weight variation of ±4 ounces. With apparatus made in accordance with this invention, 99% of the filled bags fall within a weight variation of ±2 ounces. Each weighing operation is monitored visually, thereby reducing to a minimum the need for independent check-weighing of the filled bags.

An object of this invention is the provision of automatic bag-filling apparatus having a high operating reliability, thereby eliminating the need for manual adjustment of the final weight and frequent check-weighing of the filled bags.

An object of this invention is the provision of bag-filling apparatus of simple construction whereby maintenance and trouble shooting can be handled by a semi-skilled mechanic.

An object of this invention is the provision of apparatus for filling a bag with material, said apparatus having an inclined bag-filling spout and an inclined trough for supporting a bag to receive material discharged through the spout, said trough being arranged and constructed to permit sliding removal of the filled bag from the spout.

An object of this invention is the provision of bag filling apparatus comprising a storage hopper for the material, means for filling a weigh hopper with a predetermined weight of the material, means for transferring the weighed batch of material into a bag filling feeder having a discharge spout, means for supporting a bag to receive material from the spout, and means for emptying the material from the feeder into the bag.

These and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

In the drawings wherein like reference characters denote like parts in the several views.

Figure 1:
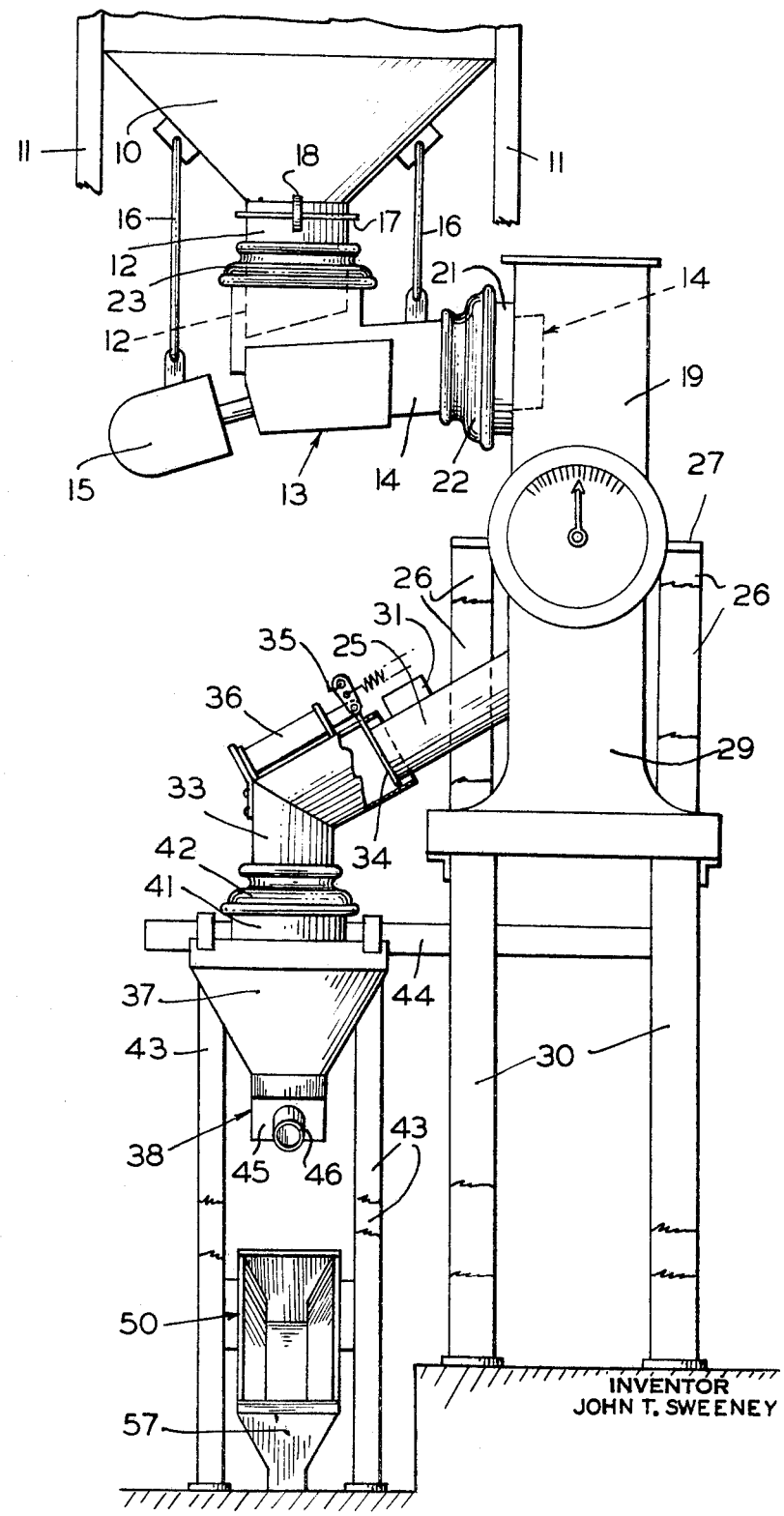
FIGURE 1 is a front elevational view of apparatus made in accordance with this invention.
Figure 2:
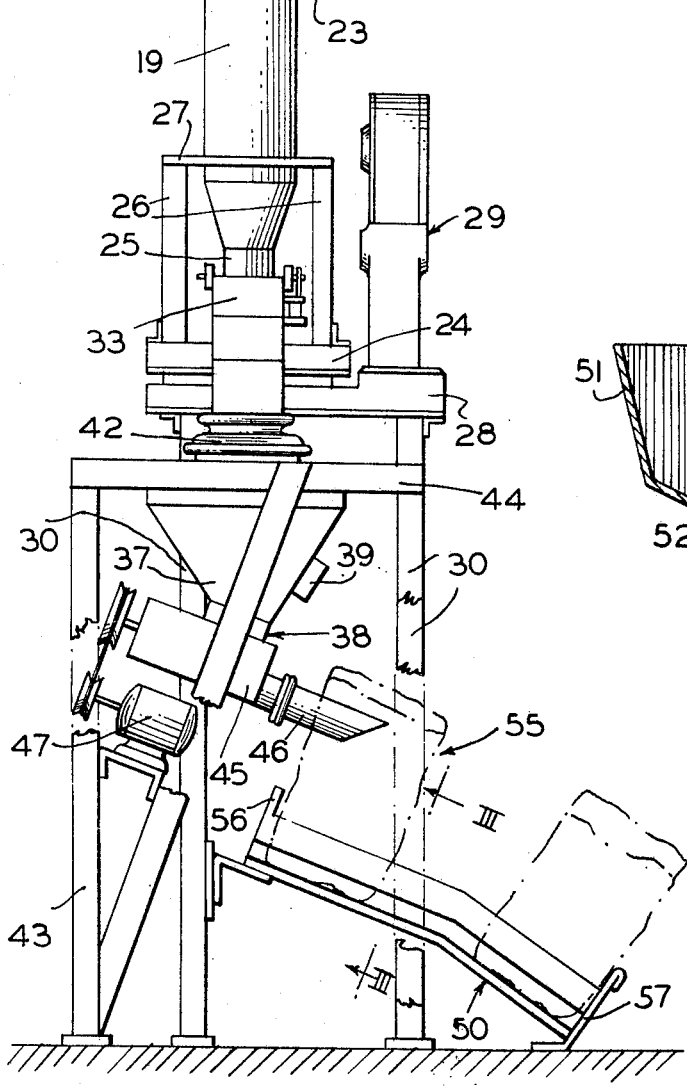
FIGURE 2 is a side elevational view thereof with the vibratory feeder omitted for clarity of disclosure.

Reference now is made to FIGURES 1 and 2 wherein there is shown a relatively large storage hopper 10 suspended from overhead steelwork or supported by a plurality of legs 11. The hopper has a conical bottom terminating in a downspout 12 which extends into a vibratory feeder 13 having a material discharge tube 14 and an electro-magnetic vibrator 15. This feeder is of conventional construction and is suspended from the storage hopper by means of four tie rods 16. Material from the hopper flows into the discharge tube 14, the flow rate of the material being manually adjustable by means of a conventional slide gate 17 provided with a handle 18. When the vibrator 15 is energized the material is vibratorily transported through the tube 14 and discharged into the vertical tube 19 constituting a portion of a weigh hopper. The open end of the discharge tube 14 extends into the vertical tube 19, passing through an enlarged-diameter lateral tube 21 which is welded to the tube 19. The clearance area between the tubes 14 and 21 is closed by a flexible sleeve 22. A similar sleeve 23 closes the clearance area between the hopper downspout and the upwardly-extending entrance tube of the feeder 13. In addition to serving as dust shields, the sleeves 22 and 23 vibrationally isolate the feeder 13 from the supply hopper and the weigh hopper. Preferably, the discharge tube 14 is inclined upwardly at an angle of some 5 degrees in the direction of material transported therethrough and the slide gate 17 is adjusted so that the level of the material transported through the feeder corresponds substantially to the radius of the discharge tube 14 when the vibrations imparted to the tube have a given maximum frequency and amplitude. Also, as will be described hereinbelow, an internal floating rake is provided at the open end of the discharge tube, which rake reduces the deviation of the material bed from the true angle of response at the point of discharge.

The weigh hopper comprises the vertical tube 19 joined to a downwardly-sloping tube 25. These tubes are supported on a base 24 by an open framework comprising four legs 26 and having ends secured to cross arms 27. The base 24 rests upon the platform 28 of a scale 29, which is supported in proper position by four legs 30. A conventional electromagnetic vibrator 31 is secured to the inclined tube 25 of the weigh hopper, which tube extends into an offset transfer tube 33 of enlarged diameter.

A spring-biased gate 34 normally closes the end of the tube 25, which gate is mounted for pivotal movement about a pin 35 by a crank arm mechanically-coupled to the armature of a solenoid 36. Upon energization of the solenoid, the gate opens to permit the flow of material from the weigh hopper into the hopper 37 of the bag-filling feeder 38, said hopper also having an electro-magnetic vibrator 39 secured thereto. This hopper has a tube 41, extending from an otherwise closed top and receiving the end of the transfer tube 33, the clearance area between these tubes being closed by a flexible sleeve 42.

The bag-filling feeder 38, supported in position on the legs 43 and cross arms 44, is a conventional rotatable screw feeder comprising the hopper 37 communicating with a trough 45 having a discharge tube 46 extending from one end thereof. Disposed within the trough and tube is a screw having a shaft passing through a bearing carried by the other end of the trough. The drive motor 47 is secured in place on the supporting framework and is mechanically-coupled to the screw by means of pulleys and a belt. The trough and discharge tube are inclined downwardly at an angle of approximately 20 degrees.

Figure 3:
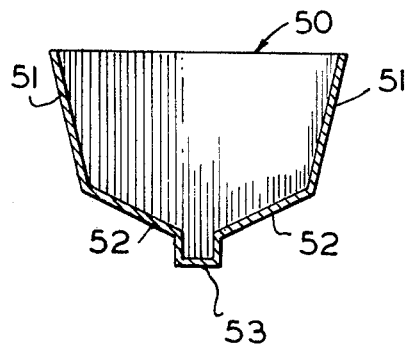
FIGURE 3 is an enlarged cross-sectional view taken along the line III—III of FIGURE 2.

A shallow inclined trough 50 is secured in fixed position to the framework and the floor, the upper portion thereof being substantially parallel to the feeder discharge tube 46 and the lower portion thereof sloping toward the floor at an angle of approximately 45 degrees. As shown in FIGURE 3, which is an enlarged cross-sectional view taken along the line III—III of FIGURE 2, the trough has side walls 51 converging toward the sloping bottom walls 52, which bottom walls terminate in a channel 53, said channel extending the full length of the trough. It will be apparent that an empty bag 55, FIGURE 2, is slidably movable along the trough until the forward side engages the rear wall 56 of the trough. In this position, the discharge tube 46 extends into the open flap of the bag. After the bag has been filled, it is pulled forward and comes to rest at a 45 degree angle against the forward trough wall 57 as it clears the discharge tube. At this angle, the bag is in position for tucking-in the flap of the bag without danger of losing the material, after which the operator has only one lifting operation to palletize the bag. The inclined disposition of the discharge tube 46 and the bag is also advantageous when filling bags of the type which have an inwardly-extending flap which is closed by the pressure of the material when the bag is removed from the discharge tube.

In summary to this point, the material flows, by gravity, from the supply hopper 10 into the vibratory feeder 13. This feeder, when operating, delivers material to the weigh hopper at an initially high rate, say, 200–250 pounds per minute, until a net weight of 47–48 pounds has been reached. At this point, the power input to the electro-magnetic vibrator 15 is lowered (as will be described below) so that material is delivered to the weigh hopper at a reduced rate, say, 30 pounds per minute. Material flow continues until the predetermined net weight of 50 pounds is reached at which point the feeder 13 is shut off. The platform scale 29 is provided with a large dial which allows the operator to maintain a visual check on the weight of material in the weigh hopper, and the scale is provided with suitable switches for control of the vibratory feeder.

When the flow of material from the vibratory feeder has been terminated and the operator has visually verified the net weight of the material in the weigh hopper, the swing gate 34 is opened by the operator and the contents of the weigh hopper then drop, by gravity, into the hopper of the screw feeder 38. During such transfer of the material to the screw feeder, the electro-magnetic vibrator 31 is energized, thereby vibrating the weigh hopper to promote a rapid and positive emptying of its contents. When the weigh hopper is empty, as verified by the scale reading, the operator closes the gate and starts the next weighing cycle. He then effects the energization of the screw-drive motor 47 and the electromagnetic vibrator 39, whereby the contents of the screw feeder are discharged into the bag at a desired rate as determined by the operating characteristics of the feeder.

Figure 4:
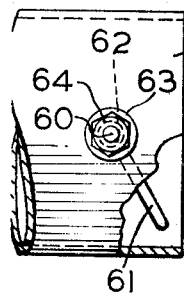
FIGURE 4 is an enlarged fragmentary side elevational view of the discharge tube of the vibratory feeder.
Figure 5:
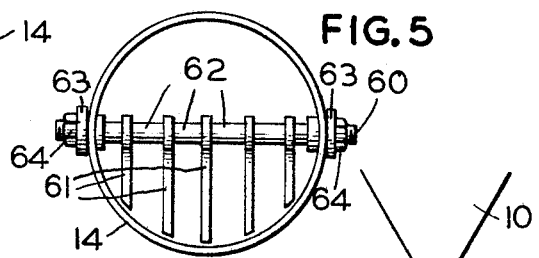
FIGURE 5 is an end view thereof.

Reference now is made to FIGURES 4 and 5 for a description of the rake, FIGURE 4 being a fragmentary, enlarged side view of the discharge tube 14 of the vibratory feeder (see also FIGURE 1) and FIGURE 5 being an end view thereof. A rod 60, having threaded ends, extends through the tube 14 along the tube diameter. The rod passes through holes formed in the upper ends of the fingers 61 and through the spacer bushings 62. End bushings 63, carried by the rod, and secured in place by the nuts 64 have shanks passing through the tube wall and into engagement with the ends of the proximate spacer bushings. The fingers are loosely mounted on shaft 60 and thereby free to float on the discharge face of the material dropping from tube 14. The gentle raking action of the fingers, as the material is transported beneath them, keeps the discharge face substantially free of deviation from the natural angle of repose. In this manner, spurious flow, resulting from belated assumption of the natural angle of repose following deactivation of the vibration feeder is prevented.

Figure 6:
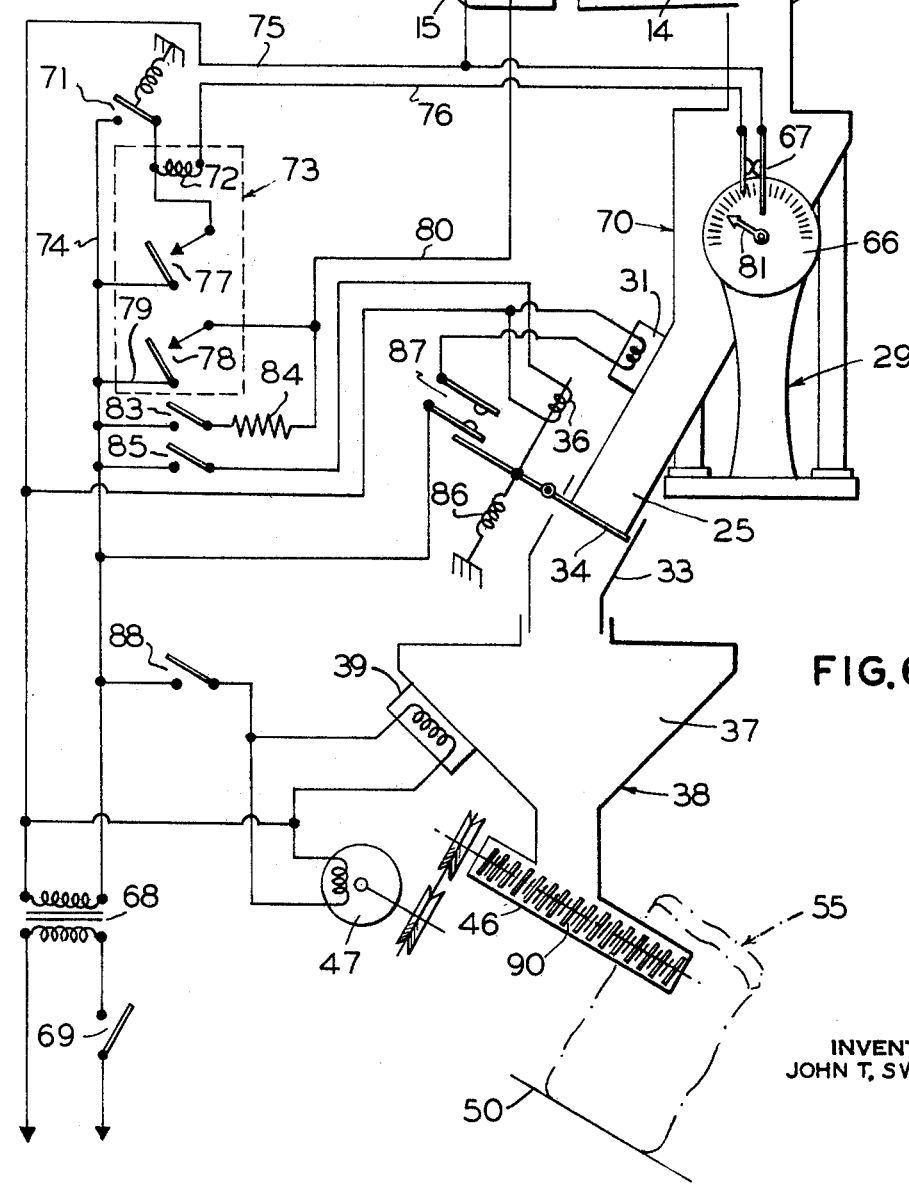
FIGURE 6 is a circuit diagram including diagrammatic representations of pertinent mechanical components.

The electrical circuit of the apparatus is shown in FIGURE 6, to which reference now is made. The scale dial 66 is provided with a pair of normally-closed contacts 67. Electrical power is obtained from a conventional 100 volt line, through an isolating transformer 68, upon closure of the line switch 69. It will be assumed that the screw feeder 38 and the weigh hopper (here identified by the numeral 70) are empty. The swing gate 34 normally is closed. The operator momentarily closes the spring-biased switch 71, thereby energizing the operating coil 72 of the relay 73, the circuit being traced as follows; the line 74, switch 71, coil 72, lead 76, closed scale contacts 67 and lead 75. Upon closure of the relay contacts 77, connected in parallel with the switch 71, the relay locks in electrically. At the same time, closure of the relay contacts 78 results in the energization of the electromagnetic vibrator 15 through the leads 79, 80 and 75. Material now flows out of the discharge tube 14 into the weigh hopper 70 at a maximum rate, for example, 200–250 pounds per minute. When the weigh hopper contains a predetermined weight of material, say, 48 pounds, the scale pointer 81 opens the contacts 67. Since these contacts are in series with the relay operating coil, the relay is deenergized and its two sets of contacts return to the illustrated, normally-open condition, the opening of the relay contacts 78 opening the circuit to the vibrator 15 thereby terminating the flow of material out of the discharge tube 14.

The operator now closes the switch 83, which switch is connected across the relay contacts 78 through a resistor 84. The vibrator 15 now vibrates the discharge tube at a lower amplitude, whereby the material now flows into the weight hopper at a reduced rate, say, 30 pounds per minute. When the pointer 81 is aligned with the 50 mark on the scale, the operator opens the switch 83. The reduced feedrate, under the manual control of the operator, permits filling the weigh hopper to a net weight of 50 pounds ±2 ounces.

The operator now closes the switch 85 which energizes the solenoid 36, thereby opening the swing gate 34, said gate being normally biased to the tightly closed position by a spring 86. Upon reaching the fully open position, the gate closes the contacts 87, thereby energizing the electro-magnetic vibrator 31. When the weight hopper is empty, as verified by the scale reading, the operator opens the switch 85 and the swing gate closes. At this point, the operator again closes the switch 71 which starts the next weighing cycle at the maximum material feedrate. Closure of the switch 88 results in the energization of the screw-drive motor 47 and the electro-magnetic vibrator 39. Rotation of the screw 90 results in the discharge of the material from the tube 46 into the bag 55 supported on the inclined trough 50.

The diagram of FIGURE 6 shows simple leaf spring switches for effecting the closure and opening of the various circuits. In the actual apparatus, micro switches or mercury switches are preferred, the latter particularly when the conditions are of an explosive character. The use of a pivotally mounted, double throw mercury switch in place of the illustrated leaf switch 67 will permit travel of the scale pointer beyond the predetermined scale mark, if so desired. Also, the manually-operable switch 83 for operation of the vibratory feeder 14 at the lower feedrate can be replaced by a second switch associated with the scale pointer.

Having now described the invention, those skilled in this art will be able to make various changes and modifications without thereby departing from the spirit and scope of the invention as recited in the following claims.

I claim:
1. Bag-filling apparatus comprising:
 (a) a supply hopper containing the material to be bagged and having a discharge opening formed in the bottom thereof,
 (b) a weighing scale having a platform,
 (c) a weigh hopper carried by said platform and having a material outlet opening,
 (d) a pointer movable relative to a scale for indicating the weight of material contained in said weigh hopper,
 (e) gate means normally closing the said outlet opening in the weigh hopper,
 (f) a vibratory feeder receiving material from the discharge opening of the supply hopper and having a tubular member with an open end in communication with the weigh hopper, said tubular member being inclined upwardly at an angle in the direction of material transport therethrough,
 (g) an electro-magnetic vibrator to vibrate the vibratory feeder to transport material through the tubular member into the weigh hopper,
 (h) manually-actuatable first control means,
 (i) means effective upon actuation of said first control means to continuously energize said vibrator for discharge of material into the weigh hopper at a first predetermined flow rate,
 (j) switch means associated with the said scale and pointer and actuated when the material in the weigh hopper reaches a predetermined weight,
 (k) means deenergizing said vibrator upon actuation of said switch means,
 (l) manually-actuatable second control means,
 (m) means effective upon actuation of said second control means to energize said vibrator for discharge of material into the weigh hopper at a second predetermined flow rate less than said first predetermined flow weight,
 (n) a rotatable screw feeder positioned to receive material from the weigh hopper when the said outlet opening is open, said feeder including a discharge tube inclined downwardly at an angle of approximately 20 degrees,
 (o) an elongated shallow trough for suporting a bag in position to receive material from the discharge tube of the screw feeder, one portion of the trough underlying the discharge tube of the screw feeder and lying substantially parallel to the axis of said discharge tube, and another portion of the trough sloping downwardly from the said one portion,
 (p) manually-controlled means to actuate the said gate means to open said outlet opening of the weigh hopper, and
 (q) manually-operable third control means to actuate the said screw feeder to discharge material through its discharge tube into the said bag.

2. The invention as recited in claim 1, including a plurality of spaced fingers disposed within the said tubular member of the vibratory feeder and at the said open end thereof, and means pivotally mounting said fingers for free rotation about a pivot axis.

3. The invention as recited in claim 1, wherein said trough has diverging side walls extending from inwardly-sloping bottom walls, said bottom walls terminating in a longitudinal channel portion.

References Cited

UNITED STATES PATENTS

| 2,436,983 | 3/1948 | Vredenburg | 177—121 |
|---|---|---|---|
| 2,687,272 | 8/1954 | Schieser et al. | 177—121 |
| 2,776,103 | 1/1957 | Bradley | 177—121 X |
| 2,212,419 | 8/1940 | Harmon | 177—120 |
| 2,610,726 | 9/1952 | Howard. | |
| 2,613,053 | 10/1952 | Dorrington et al. | 177—59 |
| 2,650,058 | 8/1953 | Read | 177—59 |
| 2,760,232 | 8/1956 | Rougemont et al. | 177— 108 X |
| 2,800,252 | 7/1957 | Wahl | 222—55 |
| 3,083,780 | 4/1963 | Swenson | 141—68 X |

FOREIGN PATENTS

| 596,302 | 5/1934 | Germany. |
|---|---|---|
| 598,294 | 6/1934 | Germany. |
| 214,163 | 4/1924 | Great Britain. |

LAVERNE D. GEIGER, Primary Examiner

E. J. EARLS, Assistant Examiner

U.S. Cl. X.R.

141—314